Patented Oct. 27, 1942

2,299,953

UNITED STATES PATENT OFFICE 2,299,953

EGG WHITE TREATMENT

Leon D. Mink, Chicago, Ill., assignor to Industrial Patents Corporation, Chicago, Ill., a corporation of Delaware No Drawing. Application August 3, 1940, Serial No. 351,263

14 Claims. (Cl. 99—210)

This invention relates to a method of producing an improved egg white product.

One of the objects of this invention is to provide a method of producing an improved dried egg product which may be readily reconstituted upon the addition of water and utilized as a substitute for fresh egg whites for such purposes as cake making.

Another object of this invention is to provide a method of producing desiccated egg white products which, when reconstituted, may be whipped to form a foam of relatively low apparent specific gravity.

Other objects and advantages of this invention will be apparent from the description and claims which follow.

Egg whites are ordinarily dried by placing the liquid egg white material in pans and subjecting the material to elevated temperatures in a drying tunnel until a dried flake-like product is produced. The dried product is then scraped from the pans and ground to produce a powder-like product. Although this method has been employed for many years, certain portions of the flaked product possess a very tough texture, and this portion, when ground, produces a product which, when reconstituted, does not whip into a light foam. The volume, texture and grain of cakes are largely dependent upon the properties and characteristics of the egg material. In the preparation of cakes by the use of dried egg whites which cannot be readily reconstituted and which, when reconstituted, cannot be whipped into a light foam or batter, the cakes produced are inferior to the cakes prepared with fresh or liquid egg whites.

In China, egg whites are generally permitted to ferment for a definite period of time before drying. The fermented material is then dried in a manner similar to that described above. The fermentation produces a very undesirable flavor which is decidedly objectionable in the dried egg product, and this objectionable odor is carried over and is distinguishable in the cakes and similar products in which this material may be incorporated.

More recently it has been proposed to desiccate egg material, particularly egg whites, by spray drying methods. Such methods have not been generally accepted because of economic disadvantages and operating difficulties. Since egg drying operations are widely distributed and generally carried out in small units, there is not sufficient volume to justify the investment required in the installation and maintenance of spray drying equipment.

In the practice of the spray drying methods, various difficulties have been encountered because of the varying nature and viscous nature of the egg whites. Some of the difficulties may be partly eliminated by reducing the viscosity of the material to be sprayed. It has been proposed to reduce the viscosity by inoculating the egg white material with certain types of bacteria and permitting the bacteria to partially ferment the material. In many cases, such fermentation, although it may be closely controlled, will impart undesirable flavors to the dried egg material. It has also been proposed to add to the liquid egg whites, a small amount of an inorganic or an organic acid. Both the fermentation step and the treatment with an acid were proposed as a means for liquefying or hydrolyzing the egg whites and thereby reduce the viscosity of the material. Although some of the spraying difficulties will be partly overcome by a reduction of the viscosity of the liquid egg white material, the properties of the spray dried product, when reconstituted, do not approach the properties of the natural liquid egg whites.

In Patent No. 2,200,963, I have disclosed and claimed a method of desiccating egg whites to produce a dried egg white product which can be readily reconstituted to produce a liquid product or foam which will possess properties substantially equivalent to those of ordinary undried egg whites. In accordance with the invention described and claimed in this patent, the egg whites are whipped into a foam, and the foam is then formed into strands or ribbons of foam. The strands or ribbons may be formed on screens which are then placed in a drying tunnel. The ribbons of foam are then dried at a relatively low temperature, and the dried material passed through a suitable mill or rollers or brushed through the screen. The foam dried egg whites may be reconstituted substantially instantaneously during the whipping or beating operations incident to cake making.

In the practice of the invention described and claimed in Patent No. 2,200,963, some difficulties have been encountered in the distribution of the foam into ribbons. These difficulties have been traced, in many cases, to the differences in whipping qualities of egg whites, and to the resultant differences and properties of the foam. Fermentation and acidulation of the liquid egg whites immediately before foaming and drying, and when employed twelve hours prior to the foaming have not been entirely satisfactory.

The present invention contemplates the addition of a small amount of hydrochloric acid to the foamed egg whites prior to dividing or distributing the foam into ribbons or strands.

The foam may be treated with acid just prior to dividing or distributing the foam into ribbons or strands, or the foam may be treated with acid and the foam then whipped for a short period prior to distributing the foam into ribbons or strands. Treatment of the foam may be made with various concentrations of hydrochloric acid.

I have found that the foam generally possesses a pH value of from 9.0 to 9.3, and prefer to add a sufficient quantity of hydrochloric acid to reduce the pH of the foam to from 6.0 to 7.0. With the average or normal egg white foam, approximately 0.3 per cent to 0.5 per cent hydrochloric acid is usually sufficient to reduce the pH to the desired value. Since the purpose of the process is to remove water, it is desirable to add as little water as possible by treatment with the acid. On the other hand, since a very small quantity of acid is added, it is desirable to add the acid in the form of a dilute solution so that a thorough distribution of the acid in the foam may be effected. Further, concentrated acid, if added directly to the liquid egg material, may be deleterious in that it will adversely affect those portions of the egg white which first come into contact with the acid. It is apparent, therefore, that these various considerations must be balanced to meet particular conditions. I prefer to employ solutions of hydrochloric acid consisting of from 5 parts to 10 parts of water to one part of concentrated hydrochloric acid.

It is apparent that the numerical values set forth above are illustrative of various conditions encountered in practicing my invention. The pH of the foam produced with natural liquid egg whites may vary from the value stated dependent upon the characteristics of the particular sample of liquid egg whites. It is obvious that if the foam possesses a lower pH value, it is possible to reduce the pH to the proper or desired value by the addition of smaller quantities of hydrochloric acid. Although I have stated that I prefer to reduce the pH to from 6.0 to 7.0, I have successfully practiced the invention by adding only such quantity of hydrochloric acid as was necessary to reduce the pH value of the foam to about 7.5.

The acidified foam having a lowered pH value possesses a softer and very fine bubble texture as compared to the normal foam. I have discovered that the foam so treated becomes far more fluid in character, although it is considerably more stable in that it requires a greater time to revert to a liquid than does the normal foam. The temperature of the egg whites at the time of foaming or beating is apparently of little importance since about the same type of foam may be produced both at room temperature and at a temperature of from 32 degrees to 36 degrees F. The only apparent difference is that, in general, the higher the temperature of the egg whites, the shorter the time required to produce a foam of the same specific gravity.

The acid may be added to the foam just prior to distributing the foam into ribbons or strands, or may be added to the foam and the foam then beaten for a short period before distribution of the foam into strands. I prefer to spray the acid into the foam and then whip the foam for a brief period before distribution of the foam into strands or ribbons on a drying screen. For example, the egg whites may be beaten to form a foam having a specific gravity of approximately 0.150. The required amount of acid is then sprayed into the form and the whipping continued thoroughly distributing the acid throughout the forementioned foam. The specific gravity of the resulting foam will, in general range from 0.115 to 0.125. It is obvious that the specific gravity may or may not lie in this range depending upon the initial properties of the liquid egg whites and on the quantity or proportion of acid which is added to the egg whites.

The invention may be carried out in the apparatus illustrated in Patent No. 2,200,963. The liquid egg whites are beaten into a foam in a suitable mixing bowl and before removal of the foam, the desired amount of acid is added and whipping continued for a brief period so as to insure a thorough distribution of the acid throughout the foam. The foam is then distributed on a suitable drying belt or screen in the form of thin strands or ribbons, and the drying screen then transferred to a suitable drying tunnel or oven.

It is obvious that the rate of drying is dependent upon the temperature, velocity of air, humidity of the air, and the general efficiency of the drying chamber, as well as the size of the ribbons or strands of foam. It is well known that egg whites are very susceptible to denaturing by heat although the temperature employed in drying may be below the coagulation temperature of the proteins present. It is, therefore, beneficial to dry the strands or ribbons of foam quickly at a low temperature. It will be understood that economic as well as operating and technical conditions must be balanced, economic conditions dictating that a high temperature should be employed to reduce the time of drying, and operating and technical conditions dictating that a very low temperature should be employed. I have found in practice that a very satisfactory product may be obtained by drying the acidulated foam at a temperature of from 110 degrees to 135 degrees F. for about one hour.

After the foam has been dried, the product may be ground in a suitable mill, although I have found that the product is readily subdivided by passing the product through rollers or rubbing or brushing it through the screen.

Hydrochloric acid is highly desirable and possesses certain advantages and characteristics which are not generally possessed by other inorganic acids. The acid is relatively cheap and inexpensive and may be handled without too great a hazard. I have found that the pH of the foam may be reduced to a pH value of between 6.0 to 7.5 by the addition of hydrochloric acid, but the pH of the dried egg material will be approximately 9.0. During the drying period, the hydrochloric acid is substantially completely vaporized and does not carry over into the dried egg white.

The dried egg product may be readily reconstituted by placing the product in water. Simultaneous with the reconstitution of the egg white, the product may be whipped or beaten into a foam for use in the culinary arts. The properties of cakes prepared with the reconstituted whipped product are substantially the same as the properties of cakes prepared with fresh egg whites. Cakes made with the dried egg products of this invention have a finer texture and cell structure and a greater degree of tenderness than cakes produced with the other types of dried egg whites.

I claim:

1. The method of treating egg whites which comprises whipping the egg whites into a foam, adding a small amount of acid to the foam sufficient to produce a softer, more fluid and more stable foam as compared to normal foam, and thereafter drying the foam.

2. The method of treating egg whites which comprises whipping the egg whites into a foam, adding a small amount of acid to the foam sufficient to produce a softer, more fluid and more stable foam as compared to normal foam, and thereafter drying the egg whites in strands of foam.

3. The method of treating egg whites which comprises beating the egg whites into a foam, adding a small amount of acid to the foam sufficient to produce a softer, more fluid and more stable foam as compared to normal foam, continuing the beating of the foam, and thereafter drying the foam.

4. The method of treating egg whites which comprises beating the egg whites into a foam, adding a small amount of acid to the foam sufficient to produce a softer, more fluid and more stable foam as compared to normal foam, continuing the beating of the foam, forming the foam into strands, and thereafter drying the egg whites in strands of foam.

5. The method of treating egg whites which comprises whipping the egg whites into a foam, reducing the pH of the foam to between 6.0 and 7.5, and thereafter drying the foam.

6. The method of treating egg whites which comprises whipping the egg whites into a foam, reducing the pH of the foam to between 6.0 and 7.5, forming the foam into strands, and thereafter drying the egg whites in strands of foam.

7. The method of treating egg whites which comprises whipping the egg whites into a foam, reducing the pH value of the foam to between 6.0 and 7.5, continuing the beating of the foam, forming the foam into ribbons, drying the ribbons, and thereafter grinding the ribbons.

8. The method of treating egg whites which comprises whipping the egg whites into a foam, adding a small amount of hydrochloric acid to the foam sufficient to produce a softer, more fluid and more stable foam as compared to normal foam, and thereafter drying the foam.

9. The method of treating egg whites which comprises whipping the egg whites into a foam, reducing the pH value of the foam to between 6.0 and 7.5 by adding hydrochloric acid, and thereafter drying the egg whites in strands of foam.

10. The method of treating egg whites which comprises whipping the egg whites into a foam, adding a small amount of hydrochloric acid to the foam sufficient to produce a softer, more fluid and more stable foam as compared to normal foam, continuing the beating of the foam, forming the foam into strands, and thereafter drying the egg whites in strands of foam.

11. The method of treating egg whites which comprises whipping the egg whites into a foam, adding hydrochloric acid in sufficient amount to reduce the pH value of the foam to between 6.0 and 7.5, continuing the beating of the foam, forming the foam into strands, and thereafter drying the egg whites in strands of foam.

12. The method of treating egg whites which comprises beating the egg whites into a foam, adding from 0.3 to 0.5 per cent hydrochloric acid to the foam, continuing the beating of the foam, forming the foam into strands, and drying the strands at the temperature of from 110 degrees to 135 degrees F.

13. The method of treating egg whites which comprises whipping the egg whites into a foam, adding a small amount of hydrochloric acid to the foam sufficient to produce a softer, more fluid and more stable foam as compared to normal foam, forming the foam into strands and quickly drying the strands.

14. The method of treating egg whites which comprises whipping the egg whites into a foam, adding hydrochloric acid to the foam in sufficient amount to reduce the pH value of the foam to between 6.0 and 7.5, and quickly drying the foam.

LEON D. MINK.